United States Patent
Kawai et al.

(10) Patent No.: US 6,752,851 B2
(45) Date of Patent: Jun. 22, 2004

(54) GAS SEPARATING AND PURIFYING METHOD AND ITS APPARATUS

(75) Inventors: Masato Kawai, Tokyo (JP); Akihiro Nakamura, Tokyo (JP); Tooru Nagasaka, Tokyo (JP); Shigeru Hayashida, Tokyo (JP)

(73) Assignee: Nippon Sanso Corporation, Tokyo (JP)

( * ) Notice: Subject to any disclaimer, the term of this patent is extended or adjusted under 35 U.S.C. 154(b) by 0 days.

(21) Appl. No.: 10/148,903

(22) PCT Filed: Oct. 19, 2001

(86) PCT No.: PCT/JP01/09189

§ 371 (c)(1),
(2), (4) Date: Jun. 19, 2002

(87) PCT Pub. No.: WO02/32550

PCT Pub. Date: Apr. 25, 2002

(65) Prior Publication Data

US 2003/0000385 A1 Jan. 2, 2003

(30) Foreign Application Priority Data

Oct. 20, 2000 (JP) ........................................ 2000-320544

(51) Int. Cl.[7] ............................................. B01D 53/053
(52) U.S. Cl. ............................... 95/96; 95/119; 95/127; 95/130; 95/139; 96/130; 96/132; 96/133; 96/144
(58) Field of Search .......................... 95/96–106, 127, 95/130, 138, 119, 139; 96/130–133, 143, 144

(56) References Cited

U.S. PATENT DOCUMENTS

| | | | | |
|---|---|---|---|---|
| 3,923,477 A | * | 12/1975 | Amond et al. ................ | 95/103 |
| 3,957,463 A | * | 5/1976 | Drissel et al. ................ | 95/103 |
| 4,190,424 A | * | 2/1980 | Armond et al. ................ | 95/98 |
| 4,369,048 A | * | 1/1983 | Pence .......................... | 95/116 |
| 4,376,639 A | * | 3/1983 | Vo ............................... | 95/101 |
| 4,376,640 A | * | 3/1983 | Vo ............................... | 95/26 |
| 4,386,945 A | * | 6/1983 | Gardner ........................ | 95/98 |
| 4,448,592 A | * | 5/1984 | Linde ........................... | 95/130 |
| 4,529,412 A | * | 7/1985 | Hayashi et al. ................ | 95/96 |
| 4,566,881 A | * | 1/1986 | Richter et al. ................ | 95/98 |
| 4,661,125 A | | 4/1987 | Haruna et al. | |
| 4,880,443 A | * | 11/1989 | Miller et al. ................... | 95/98 |
| 4,985,052 A | * | 1/1991 | Haruna et al. ................ | 95/101 |
| 5,071,449 A | * | 12/1991 | Sircar ........................... | 95/98 |
| 5,085,674 A | | 2/1992 | Leavitt | |
| 5,395,427 A | * | 3/1995 | Kumar et al. ................. | 95/101 |
| 5,451,248 A | * | 9/1995 | Sadkowski et al. ........... | 95/99 |
| 5,547,492 A | * | 8/1996 | Cho et al. ..................... | 95/100 |
| 6,152,991 A | * | 11/2000 | Ackley .......................... | 95/96 |
| 6,197,092 B1 | * | 3/2001 | Butwell et al. ................ | 95/96 |
| 6,261,343 B1 | * | 7/2001 | Golden et al. ................ | 95/96 |
| 6,290,751 B1 | * | 9/2001 | Ragil et al. .................... | 95/101 |
| 6,475,265 B1 | * | 11/2002 | Baksh et al. .................. | 95/96 |

FOREIGN PATENT DOCUMENTS

| | | |
|---|---|---|
| JP | 59-107916 | 6/1984 |
| JP | 7-267612 | 10/1995 |

* cited by examiner

Primary Examiner—Robert H. Spitzer
(74) Attorney, Agent, or Firm—Armstrong, Kratz, Quintos, Hanson & Brooks, LLP

(57) ABSTRACT

The gas separation and purification process can recover efficiently a valuable gas such as krypton and xenon to be used as an atmospheric gas in a semiconductor manufacturing equipment etc. by means of PSA process. In the process for separating a valuable gas in the form of purified product from a mixed gas, used as a raw gas, containing the valuable gas by means of pressure swing adsorption process, the valuable gas is separated and purified by using as the pressure swing adsorption process a combination of equilibrium pressure swing adsorption process for separating gas components based on the difference in equilibrium adsorption and rate-dependent pressure swing adsorption process for separating the gas components based on the difference in adsorption rates.

10 Claims, 8 Drawing Sheets

GAS SEPARATING AND PURIFYING METHOD AND ITS APPARATUS

TECHNICAL FIELD

The present invention relates to a gas separation and purification process and an apparatus therefor, more specifically to a process and an apparatus for recovering a valuable gas in the form of purified product, and particularly to a gas separation and purification process and an apparatus therefor, which can be most suitably used for recovering and recycling valuable noble gases such as krypton and xenon to be used as atmospheric gases in semiconductor manufacturing equipment and the like.

BACKGROUND ART

In a process for manufacturing semiconductor products such as semiconductor integrated circuits, liquid crystal panels, solar panels and magnetic discs, there are used a wide variety of devices which generate plasma in a noble gas atmosphere to carry out various kinds of treatments for semiconductor products by the plasma thus generated, for example, sputtering machines, plasma CVD reactors, reactive ion etching machines, etc.

Such processing devices are operated as follows: When substrates and the like to be treated are fed into a processing chamber, a nitrogen gas atmosphere is formed in the processing chamber, and when a plasma treatment is carried out, a noble gas is charged singly or optionally together with a gas which promotes the reaction to the chamber to generate plasma by high-frequency discharge and carry out treatment of the substrates therewith. Subsequently, the chamber is purged by charging nitrogen gas thereto, and the substrates are taken out therefrom. As the gas for promoting the reaction in a treatment, for example, in a plasma oxidation treatment, a certain quantity of oxygen is added.

While argon has predominantly been used as the noble gas to be employed in such treatments, krypton and xenon having low ionization potentials are coming to the fore for more sophisticated applications.

Krypton and xenon are extremely expensive, since they are present in air at very low ratios and require intricate separation processes, so that the processes employing such gases are appreciated economically, only on the premise that used gases are recovered, purified and recycled.

A mixed gas containing a noble gas to be separated and purified consists mainly of a noble gas and nitrogen. In a plasma oxidation treatment, such a mixed gas containing additionally a certain quantity of oxygen is used. Meanwhile, in a plasma CVD treatment and a reactive ion etching treatment, a metal hydrogen compound gas and a halogenated carbon gas are additionally used respectively. Further, moisture, carbon monoxide, carbon dioxide, hydrogen, hydrocarbons, etc. are occasionally contained as trace impurities.

Xenon is also drawing attention for its application as an anesthetic gas in the form of mixture with a predetermined amount of oxygen (usually ca. 30%). The mixed gas to be subjected to the separation and purification treatment is a patient's exhalation containing, for example, oxygen, nitrogen, carbon dioxide and moisture in addition to xenon. In this case, it is necessary to remove nitrogen, carbon dioxide, etc. from the mixed gas in order to recycle xenon.

Referring to the prior art to recover a specific component from a mixed gas by the pressure swing adsorption (PSA) process and purifying it, it is described extensively, for example, in a literature "Pressure Swing Adsorption, 1994 VCH Publishers Inc., collaborated by D. M. Ruthven, S. Farooq and K. S. Knaebel", Chapter 6.

Paragraph 6.5 of the literature explains a four-column PSA process for recovering hydrogen from various kinds of mixed gases and purifying it. This hydrogen PSA process utilizes the nature of hydrogen that it is extremely difficult to adsorb compared with other components of the mixed gas. Table 6.2 in the above literature shows test conditions and performance data of the four-column hydrogen PSA purification system. It is disclosed in Table 6.2 that if a high product (hydrogen) concentration of 99.9% or more is to be obtained in the conventional hydrogen PSA process, the rate of hydrogen recovery reduces to less than 80%.

Paragraph 6.6 of the above literature also explains a four-column PSA process for recovering carbon dioxide gas from a combustion waste gas and purifying it. Table 6.4 in the literature shows performance data of the PSA process for recovering carbon dioxide gas from a combustion waste gas and purifying it. It is disclosed in Table 6.4 that even if the product had a relatively low concentration of about 99%, the recovery rate of carbon dioxide gas was at most about 72%.

Paragraph 6.7 of the above literature also explains a PSA process for recovering methane from a gas occurring in dumpsite. It is disclosed in Paragraph 6.7 that when a recovery rate of 90% or higher is to be obtained by the conventional methane recovering PSA process, the product had a methane concentration of 89%.

Meanwhile, Japanese Unexamined Patent Publication No. H6-182133 (182133/94) discloses a process and an apparatus for recovering and purifying a noble gas in a high yield. This invention relates to recovery and purification of helium, and helium is recovered while an off-gas from the PSA process having been conventionally treated as a waste gas is recycled to be admixed to a raw gas, thus achieving high yield. However, the mixed raw gas is treated batchwise in this invention and cannot be treated continuously.

Japanese Unexamined Patent Publication No. H10-273307 (273307/98) discloses as follows: "The chamber is purged with a purge gas to form a gaseous outflow containing a noble gas and the purge gas, and the outflow is recovered from the chamber for recycling. The purge gas is preferably selected from hydrogen, steam, ammonia, carbon dioxide, carbon monoxide, oxygen and hydrocarbons having 2 to 6 carbon atoms. A noble gas flow is preferably separated from the outflow by means of membrane separation, condensation, adsorption, absorption, crystallization or by a combination thereof."

Further, Japanese Unexamined Patent Publication No. H11-157814 (157814/99) discloses a process relating to switching between an operation of introducing a noble gas-containing off-gas discharged from a plant where the noble gas is used to a recovery system and an operation of discharging it therefrom. However, this invention merely discloses as follows: "While adsorption, membrane separation and the like can be employed, a getter type purification apparatus employing a metal such as titanium, vanadium, zirconium and nickel or an alloy thereof is suitably used."

Japanese Unexamined Patent Publication No 2000-171589 discloses a process for recovering krypton/xenon using natural zeolite as a process for recovering a radioactive noble gas. Although this invention discloses adsorption of the noble gas contained in helium gas, there is no disclosure of desorption, recovery nor recycling thereof.

Japanese Unexamined Patent Publication No. 2000-26319 discloses a process for recovering lower hydrocarbons from an off-gas from a polyolefin manufacturing plant by means of PSA process. This invention is directed to carrying out a recycling operation of mixing a purge off-gas to a raw gas so as to obtain a high recovery rate. However, according to embodiments of the invention, the recovery rate was about 90% when the lower hydrocarbon concentration was 99.9%, and 10% of lower hydrocarbons remained unrecovered.

As described heretofore, there has so far been neither process nor apparatus for recovering a specific component in a mixed gas by a PSA process continuously at a high purity and in a high recovery rate of 95 to 99% or more. Further, there are a very few published adsorption data on krypton and xenon. For example, Journal of Colloid and Interface Science, Vol. 29, No. 1, January 1969 describes adsorption data of krypton onto activated carbon and zeolite 5A at 25° C. According to the data, it can be understood that activated carbon adsorbent adsorbs a large amount of krypton over zeolite 5A. A process for recovering an easily adsorbable component in the form of high-purity product is disclosed, for example, in Japanese Unexamined Patent Publication No. H3-12212 (12212/91), describing a process for separating and recovering nitrogen from air through three major steps of adsorption-cleaning-desorption.

In a consideration based on the adsorption data on krypton as described above, the activated carbon adsorbent has a sufficiently large amount of krypton adsorption compared with the adsorption of nitrogen as an impurity component, so that the process disclosed in Japanese Unexamined Patent Publication No. H3-12212 (12212/91) is deemed to be applicable. However, in the process ibid., since there is used a large amount of cleaning gas for obtaining a high-purity product, no high recovery rate can be expected.

That is, it has been difficult in the prior art to enhance sufficiently economical efficiency in the system handling a noble gas such as krypton and xenon. Particularly, none of the prior art techniques incorporated herein was successful in recovering a valuable noble gas by separation and purification from a mixed gas having been recovered by purging a chamber of a semiconductor manufacturing equipment with a nitrogen gas or by suction with a vacuum pump and containing the noble gas such as krypton and xenon like in the case as described above, in an amount of about 25 to 75%. Thus, a novel technology has been awaited to be exploited.

As described above, in the conventional semiconductor manufacturing equipment and the like, once a valuable gas such as krypton or xenon is used as an atmospheric gas, it is released to the outside, so that the cost of atmospheric gas notably increases, disadvantageously. Besides, there is a problem that it has been difficult to recover the valuable noble gas from the chamber of the semiconductor manufacturing equipment continuously by means of PSA process at a high purity and in a high recovery rate of 95% or more, and it has been far more difficult technologically to give a higher recovery rate of 99% or more.

Therefore, the present invention is directed to providing a gas separation and purification process and an apparatus therefor, which can recover a valuable gas and purifying it efficiently by means of PSA process using as a raw gas a mixed gas containing a valuable gas such as krypton and xenon to be used as an atmospheric gas in semiconductor manufacturing equipment and the like.

DISCLOSURE OF THE INVENTION

In the gas separation and purification process according to the present invention, a valuable gas is separated in the form of purified product from a mixed gas, used as a raw gas, containing the valuable gas by means of pressure swing adsorption process, wherein the pressure swing adsorption process contains a combination of equilibrium pressure swing adsorption process for separating gas components based on the difference in the amounts of adsorbed gases at equilibrium, and rate-dependent pressure swing process for separating the gas components based on the difference in adsorption rates.

In the gas separation and purification process according to the present invention, the raw gas is separated into an easily adsorbable component and a hardly adsorbable component by the equilibrium pressure swing adsorption process to release the hardly adsorbable component in the equilibrium pressure swing adsorption process as an off-gas, whereas the easily adsorbable component in the equilibrium pressure swing adsorption process is separated into an easily adsorbable component and a hardly adsorbable component by the rate-dependent pressure swing adsorption process to collect the hardly adsorbable component in the rate-dependent pressure swing adsorption process as a product gas. Particularly, the easily adsorbable component in the rate-dependent pressure swing adsorption process is circulated to the equilibrium pressure swing adsorption process to be subjected to re-separation there.

Further, the raw gas is separated into an easily adsorbable component and a hardly adsorbable component by the rate-dependent pressure swing adsorption process to collect the hardly adsorbable component in the rate-dependent pressure swing adsorption process as a product gas, whereas the easily adsorbable component in the rate-dependent pressure swing adsorption process is separated into an easily adsorbable component and a hardly adsorbable component by the equilibrium pressure swing adsorption process to release the hardly adsorbable component in the equilibrium pressure swing adsorption process as an off-gas. Particularly, the easily adsorbable component in the equilibrium pressure swing adsorption process is circulated to the rate-dependent pressure swing adsorption process to be subjected to re-separation there.

Further, the raw gas is separated into an easily adsorbable component and a hardly adsorbable component by the rate-dependent pressure swing adsorption process to release the easily adsorbable component in the rate-dependent pressure swing adsorption process as an off-gas, whereas the hardly adsorbable component in the rate-dependent pressure swing adsorption process is separated into an easily adsorbable component and a hardly adsorbable component by the equilibrium pressure swing adsorption process to collect the easily adsorbable component in the equilibrium pressure swing adsorption process as a product gas. Particularly, the hardly adsorbable component in the equilibrium pressure swing adsorption process is circulated to the rate-dependent pressure swing adsorption process to be subjected to re-separation there.

Further, the raw gas is partly separated into an easily adsorbable component and a hardly adsorbable component by the equilibrium pressure swing adsorption process to release the hardly adsorbable component in the equilibrium pressure swing adsorption process as an off-gas, and the easily adsorbable component in the equilibrium pressure swing adsorption process is admixed with the raw gas; whereas the rest of the raw gas is separated into an easily adsorbable component and a hardly adsorbable component by the rate-dependent pressure swing adsorption process to collect the hardly adsorbable component in the rate-dependent pressure swing adsorption process as a product gas, and the easily adsorbable component in the rate-dependent pressure swing adsorption process is admixed with the raw gas. Particularly, the raw gas is supplied to the equilibrium pressure swing adsorption process and the rate-dependent pressure swing adsorption process after pressurization, and the easily adsorbable component in the equilibrium pressure swing adsorption process and the easily adsorbable component in the rate-dependent pressure swing adsorption process are admixed with the raw gas before pressurization.

In a gas separation and purification apparatus according to the present invention, a valuable gas is separated in the form of purified product from a mixed gas, used as a raw gas, containing the valuable gas by a pressure swing adsorption unit, wherein the pressure swing adsorption unit contains an equilibrium pressure swing adsorption unit, which separates gas components based on the difference in equilibrium adsorption, and a rate-dependent pressure swing adsorption unit, which separates the gas components based on the difference in adsorption rates.

Further, in the gas separation and purification apparatus according to the present invention, the equilibrium pressure swing adsorption unit is connected in series with the rate-dependent pressure swing adsorption unit such that the former unit is located on the upstream side and the latter unit is located on the downstream side; the upstream equilibrium pressure swing adsorption unit is provided with a passage for extracting a hardly adsorbable component in the equilibrium pressure swing adsorption unit as an off-gas and a passage for introducing an easily adsorbable component in the equilibrium pressure swing adsorption unit to the downstream rate-dependent pressure swing adsorption unit; whereas the downstream rate-dependent pressure swing adsorption unit is provided with a passage for extracting a hardly adsorbable component in the rate-dependent pressure swing adsorption unit as a product gas and a passage for circulating an easily adsorbable component in the rate-dependent pressure swing adsorption unit to the raw gas supply side of the equilibrium pressure swing adsorption unit.

Further, the gas separation and purification apparatus is further provided with a passage for diverting the raw gas and supplying it into the equilibrium pressure swing adsorption unit and to the downstream rate-dependent pressure swing adsorption unit; a passage for admixing the easily adsorbable component in the equilibrium pressure swing adsorption unit with the raw gas to be supplied to the rate-dependent pressure swing adsorption unit; and a passage for admixing the easily adsorbable component in the rate-dependent pressure swing adsorption unit with the raw gas to be supplied to the equilibrium pressure swing adsorption unit.

Further, the equilibrium pressure swing adsorption unit uses activated carbon as an adsorbent. The rate-dependent pressure swing adsorption unit uses Na—A zeolite or carbon molecular sieve as an adsorbent. The valuable gas is at least one of krypton and xenon.

According to the present invention, since valuable gases such as krypton and xenon contained in a mixed gas to be discharged from a semiconductor manufacturing equipment and the like using such a valuable gas can be recovered at a high purity and in a high recovery rate, the cost of the atmospheric gas in the semiconductor manufacturing equipment etc. can be reduced notably.

BEST MODE FOR CARRYING OUT THE INVENTION

Figure 1:
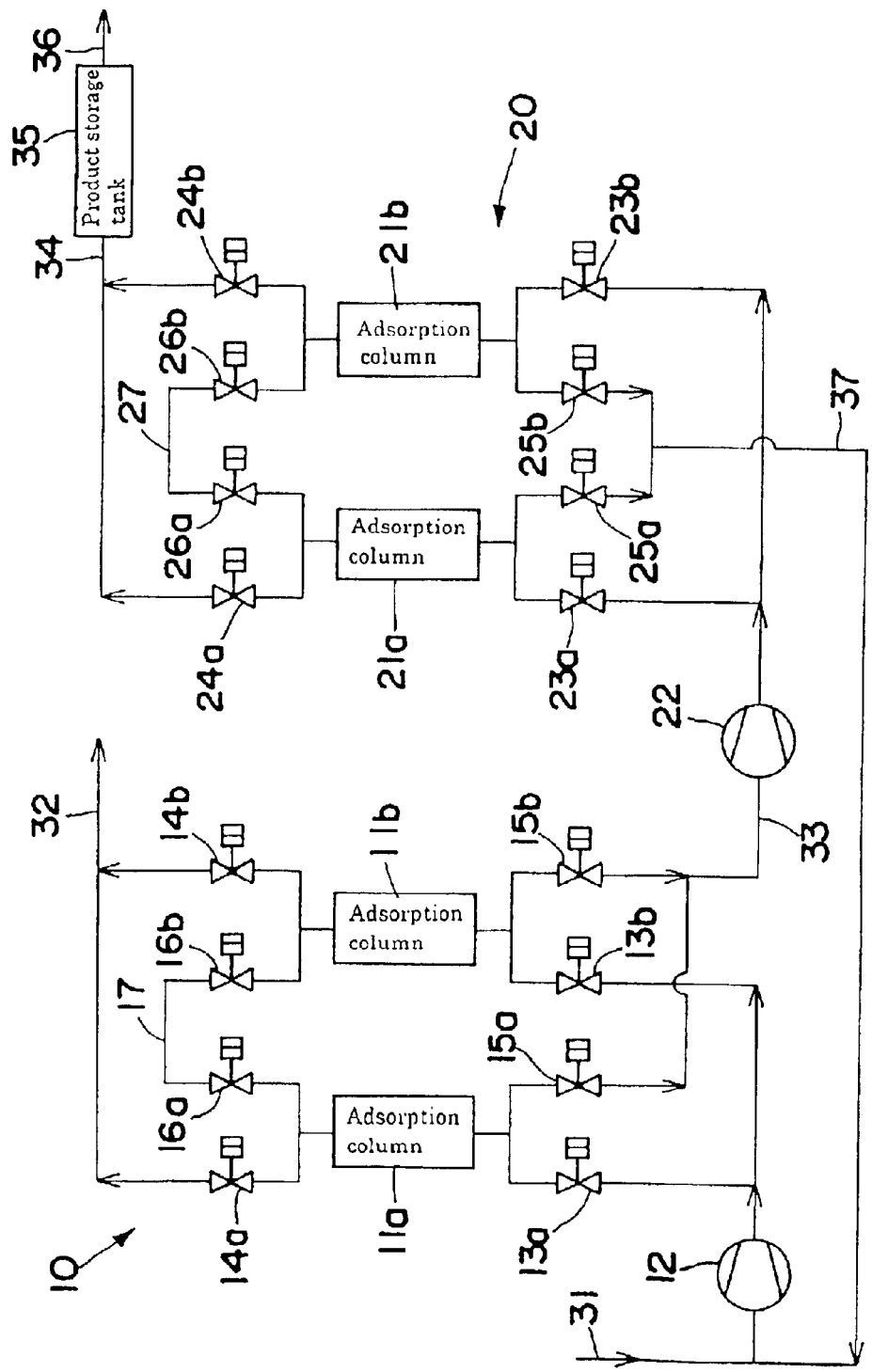
FIG. 1 is a schematic diagram showing the gas separation and purification apparatus according to a first embodiment of the present invention.

FIG. 1 is a schematic diagram showing the gas separation and purification apparatus according to a first embodiment of the present invention.

The gas separation and purification apparatus, which is designed to recover krypton or xenon as a valuable gas and to separate it as a purified product, is provided with an equilibrium pressure swing adsorption unit 10 and a rate-dependent pressure swing adsorption unit 20. The equilibrium pressure swing adsorption unit 10 separates gas components based on the difference in equilibrium adsorption, and the rate-dependent pressure swing adsorption unit 20 separates the gas components based on the difference in adsorption rates.

The equilibrium pressure swing adsorption unit 10 has a plurality of adsorption columns 11a and 11b packed with an adsorbent such as activated carbon, for which krypton and xenon are easily adsorbable components, while nitrogen is a hardly adsorbable component; a compressor 12 for compressing a raw gas to a predetermined adsorption pressure; and a plurality of valves provided at predetermined positions so as to switch the adsorption columns 11a and 11b between an adsorption step and a regeneration step interchangeably.

Meanwhile, the rate-dependent pressure swing adsorption unit 20 has a plurality of adsorption columns 21a and 21b packed with an adsorbent such as Na—A zeolite or carbon molecular sieve, for which krypton and xenon are hardly adsorbable components, while nitrogen is an easily adsorbable component; a compressor 22 for supplying a feed gas to the unit 20; and valves provided at predetermined positions so as to switch the adsorption columns 21a and 21b between the adsorption step and the regeneration step interchangeably.

Provided that a mixed gas of krypton and nitrogen is used as a raw gas and that activated carbon and Na—A zeolite are used as the adsorbent in the equilibrium pressure swing adsorption unit 10 and that in the rate-dependent pressure swing adsorption unit 20 respectively, there will be described procedures of separating krypton and nitrogen in the raw gas from each other to obtain krypton in the form of purified product. It should be understood here that, in these units, the adsorption columns 11a and 21a are initially performing the adsorption step.

Figure 2:
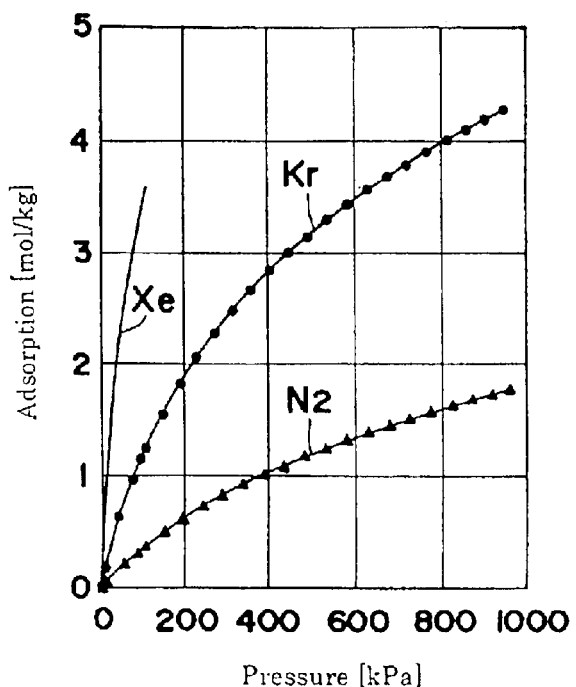
FIG. 2 is a diagram showing adsorption isotherm of krypton, xenon and nitrogen adsorbed on activated carbon.

First, in the equilibrium pressure swing adsorption unit 10, the raw gas is introduced through a raw gas introducing passage 31 and is compressed to a predetermined pressure by the compressor 12. The compressed raw gas passes through an inlet valve 13a and flows into the adsorption column 11a. Since the activated carbon packed in the adsorption columns 11a and 11b adsorbs nitrogen ($N_2$) with difficulty rather than krypton (Kr) and xenon (Xe), as shown by the adsorption isotherm (at a temperature of 298 K.) in FIG. 2, the activated carbon adsorbs preferentially the easily adsorbable component krypton in the raw gas flowed into the adsorption column 11a, whereas the hardly adsorbable component nitrogen is discharged from the outlet end of the adsorption column 11a into a primary off-gas releasing passage 32 through an outlet valve 14a. In the meantime, the other adsorption column 11b is performing the regeneration step, and the adsorbed gas is discharged through a regeneration valve 15b to flow into a suction side (primary side) passage 33 of the compressor 22 of the rate-dependent pressure swing adsorption unit 20.

Here, it is possible to perform, at the time of switching between the adsorption step and the regeneration step, a pressure equalizing operation using a pressure equalizing passage 17 having pressure equalizing valves 16a and 16b, and a purge regeneration operation to introduce a purge gas from the outlet side of the column in the regeneration step, like in the conventional PSA process.

Before the adsorption of krypton onto the activated carbon in the adsorption column 11a reaches the critical limit to let krypton flow out through the column outlet, the inlet valves 13a and 13b, the outlet valves 14a and 14b, and the regeneration valves 15a and 15b are switched to switch the steps in the adsorption columns 11a and 11b such that the adsorption column 11a and the adsorption column 11b perform the regeneration step and the adsorption step, respectively.

In the regeneration step, since the krypton adsorbed on the activated carbon is desorbed therefrom upon reduction of the internal pressure of the column, the gas to be extracted from the adsorption column into the passage 33 in the regeneration step is a concentrated krypton gas (primary purified gas). After this primary purified gas is compressed to a predetermined pressure by the compressor 22, it flows through an inlet valve 23a into the adsorption column 21a performing the adsorption step. Here, the passage 33 may be provided with a buffer tank for equalizing the concentration and flow rate of the primary purified gas.

Figure 3:
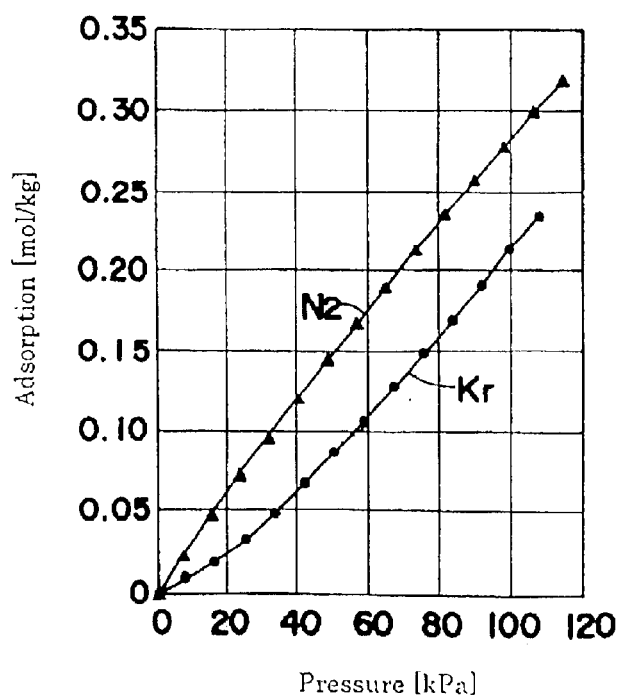
FIG. 3 is a diagram showing adsorption isotherm of krypton and nitrogen adsorbed on Na-A zeolite.
Figure 4:
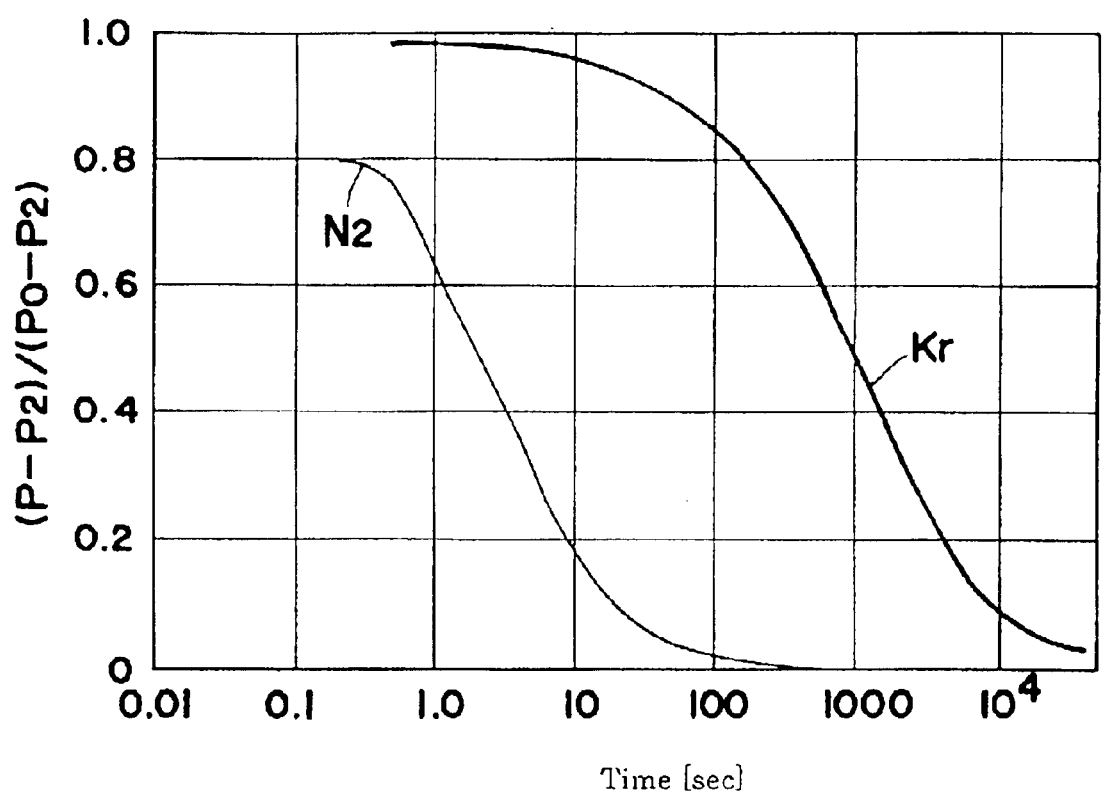
FIG. 4 is a diagram showing adsorption rates of krypton and nitrogen onto Na-A zeolite.

While Na—A zeolite, the so-called zeolite 4A, packed in the adsorption columns 21a and 21b adsorbs krypton (Kr) and nitrogen ($N_2$) in almost equal amounts, as shown by the adsorption isotherm of FIG. 3, it adsorbs krypton (Kr) and xenon (Xe) slowly compared with nitrogen ($N_2$), as shown by the results of adsorption rate measurement shown in FIG. 4 (adsorption rate of xenon is too low to appear on the graph of FIG. 4). Thus, zeolite 4A adsorbs preferentially nitrogen as an easily adsorbable component which is adsorbed quickly and easily among other components of the primary purified gas flowed into the adsorption column 21a, whereas krypton is extracted from the outlet end of the adsorption column 21a and flows through an outlet valve 24a into a secondary purified gas extracting passage 34 as a hardly adsorbable component which is adsorbed slowly and hardly by zeolite 4A. The gas extracted to the secondary purified gas extracting passage 34 is stored temporarily as a product krypton in a product storage tank 35 and then supplied through a product extracting passage 36 to a site where the product gas is used. The graduation along the axis of ordinate shown in FIG. 4 indicates residual adsorbable quantity when the equilibrium adsorption is 1 at a given temperature.

When the adsorption column 21a is performing the adsorption step, the adsorption column 21b is performing the regeneration step. In the regeneration step, a regeneration valve 25b is opened to discharge the gas in the adsorption column 21b to a secondary off-gas extracting passage 37. It is here again possible to perform, at the time of switching between the adsorption step and the regeneration step, the pressure equalizing operation using a pressure equalizing passage 27 having pressure equalizing valves 26a and 26b, and a purge regeneration operation to introduce a purge gas from the outlet side of the column in the regeneration step, like in the conventional PSA process.

Before the adsorption of nitrogen onto the zeolite 4A in the adsorption column 21a reaches the critical limit to let nitrogen flow out through the column outlet, the inlet valves 23a and 23b, the outlet valves 24a and 24b, and the regeneration valves 25a and 25b are switched to switch the steps in the adsorption columns 21a and 21b such that the adsorption column 21a and the adsorption column 21b perform the regeneration step and the adsorption step, respectively.

In the regeneration step, not only the nitrogen desorbed from the zeolite 4A is released but also the primary purified gas present in the column flows out upon reduction of the internal pressure of the column, so that the secondary off-gas to be discharged in the regeneration step of the rate-dependent pressure swing adsorption unit 20 contains a substantial amount of krypton. Therefore, the secondary off-gas discharged into the secondary off-gas extracting passage 37 is recycled to the primary side of the compressor 12 to be admixed to the raw gas, and the resulting mixed gas is subjected to re-separation in the equilibrium pressure swing adsorption unit 10. Thus, the krypton contained in the secondary off-gas can be recovered into the primary purified gas.

In each of the pressure swing adsorption units 10 and 20, while the concentration of the easily adsorbable component contained in the hardly adsorbable component flowing out from the adsorption column in the adsorption step tends to increase with time, the content of nitrogen to be contained as an impurity in the product krypton collected finally from the secondary purified gas extracting passage 34 can be controlled by adjusting the amount of the hardly adsorbable component to be extracted during a predetermined period of adsorption step, so that the period of adsorption step and the amount of hardly adsorbable component to be extracted can be determined in view of purity required of the product krypton and of economical efficiency.

Figure 5:
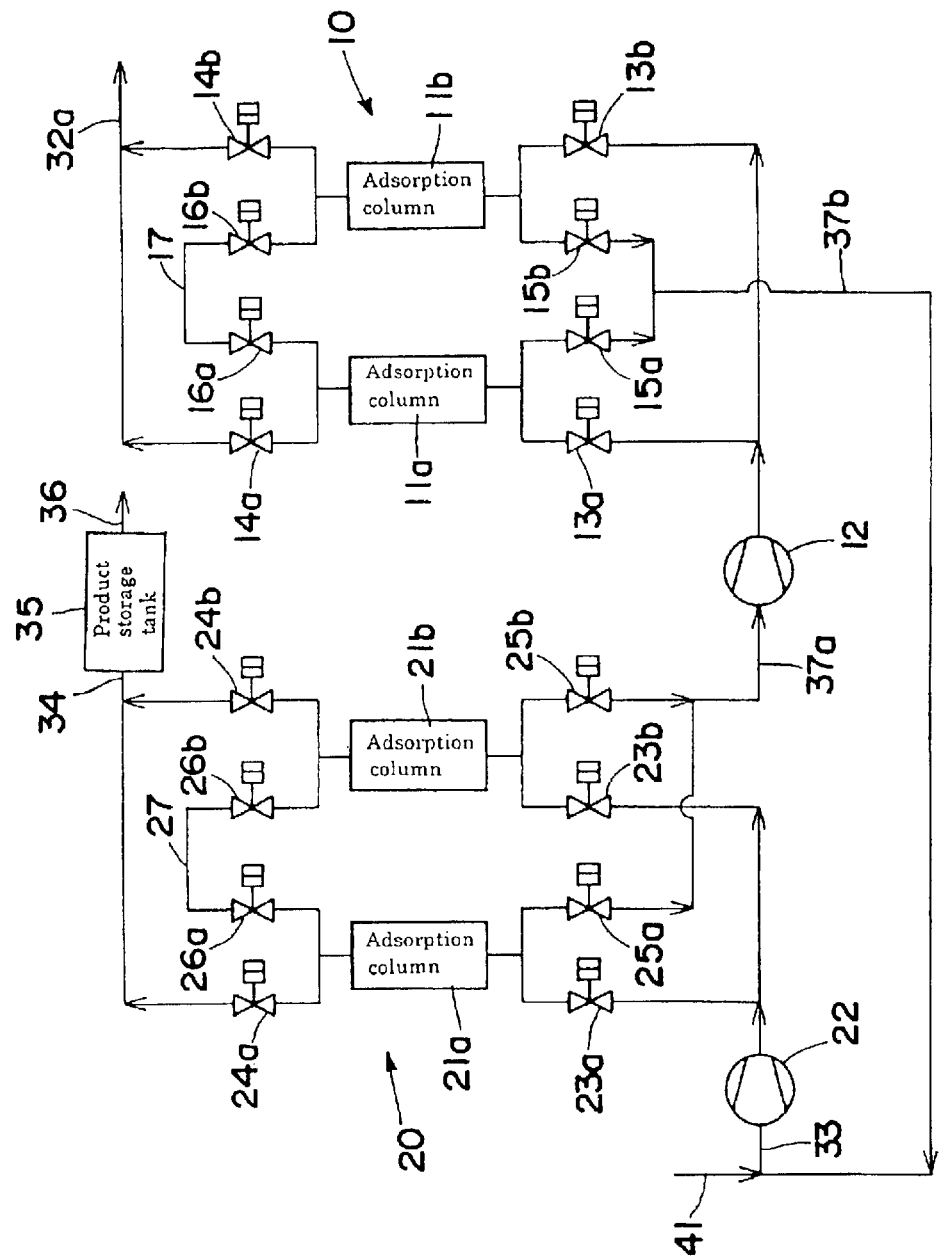
FIG. 5 is a schematic diagram showing the gas separation and purification apparatus according to a second embodiment of the present invention.

FIG. 5 is a schematic diagram showing the gas separation and purification apparatus according to a second embodiment of the present invention. It should be noted here that in the following description the same or like components as those in the first embodiment are affixed with the same reference numbers respectively, and detailed descriptions of them will be omitted.

The gas separation and purification apparatus shown in this embodiment exemplifies a case where the apparatus has a combination of the equilibrium pressure swing adsorption unit 10 and the rate-dependent pressure swing adsorption unit 20 like in the first embodiment, and a raw gas introducing passage 41 provided on the primary side passage 33 of the compressor 22 of the rate-dependent pressure swing adsorption unit 20. In other words, the equilibrium pressure swing adsorption unit 10 and the rate-dependent pressure swing adsorption unit 20 are combined with each other such that the unit 20 locates on the upstream side and the unit 10 locates on the downstream side.

The raw gas from the raw gas introducing passage 41 is compressed by the compressor 22 and then introduced to the rate-dependent pressure swing adsorption unit 20, where the hardly adsorbable component krypton and the easily adsorbable component nitrogen are separated from each other by the zeolite 4A packed in the adsorption column 21a (21b) of the unit 20. The hardly adsorbable component krypton is supplied from the purified gas extracting passage 34a, and through the product storage tank 35 and the product lead-out passage 36, to a site where the product gas is used.

The primary off-gas extracted from the rate-dependent pressure swing adsorption unit 20 to a primary off-gas extracting passage 37a is compressed by the compressor 12 and introduced to the equilibrium pressure swing adsorption unit 10, where the easily adsorbable component krypton and the hardly adsorbable component nitrogen contained in the primary off-gas are separated from each other by the activated carbon packed in the adsorption column 11a (11b) of the unit 10, and the hardly adsorbable component nitrogen is exhausted through the off-gas releasing passage 32a.

Meanwhile, the secondary purified gas extracted through the regeneration valve 15a (15b) in the regeneration step of the equilibrium pressure swing adsorption unit 10 passes through a passage 37b and flows into the primary side passage 33 of the compressor 22 to be admixed to the raw gas introduced through the raw gas introducing passage 41. The resulting mixed gas is then introduced to the rate-dependent pressure swing adsorption unit 20 and is subjected to re-separation there.

Figure 6:
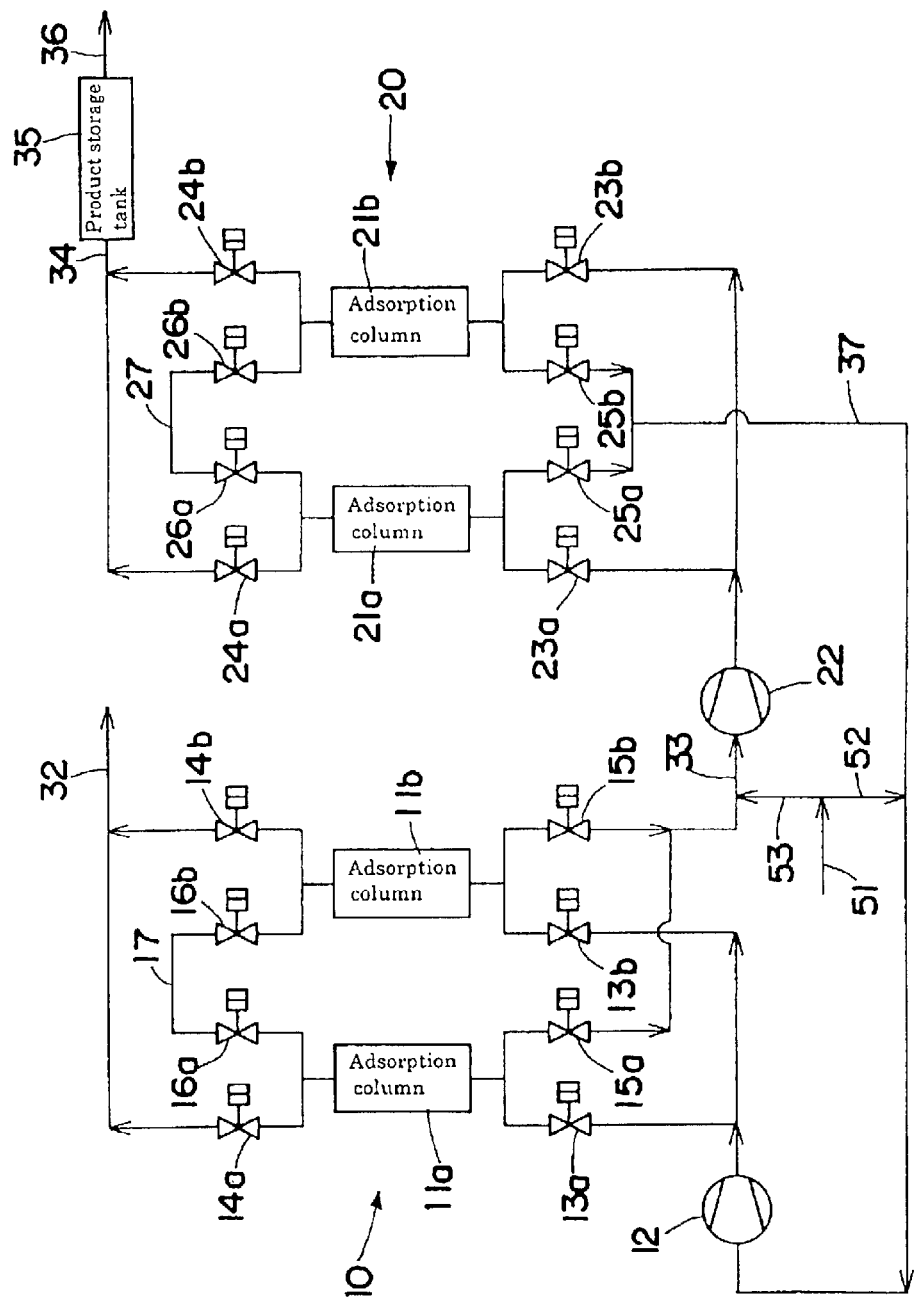
FIG. 6 is a schematic diagram showing the gas separation and purification apparatus according to a third embodiment of the present invention.

FIG. 6 is a schematic diagram showing the gas separation and purification apparatus according to a third embodiment of the present invention. The apparatus has a combination of the equilibrium pressure swing adsorption unit 10 and the rate-dependent pressure swing adsorption unit 20 like in the first embodiment, and a raw gas introducing passage 51 which is diverged into a passage 52 and a passage 53. One passage 52 is connected to the primary side of the compressor 12 of the equilibrium pressure swing adsorption unit 10, and the other passage 53 is connected to the primary side of the compressor 22 of the rate-dependent pressure swing adsorption unit 20.

More specifically, the raw gas partly flows through the passage 52 and is combined with the secondary off-gas flowing through the secondary off-gas extracting passage 37, and the resulting mixed gas is compressed by the compressor 12 and is introduced into the equilibrium pressure swing adsorption unit 10, whereas the rest of the raw gas passes through the passage 53 to be combined with the primary purified gas, i.e., the easily adsorbable component in the equilibrium pressure swing adsorption unit 10, flowing through the primary side passage 33 of the compressor 22. The resulting mixed gas is then compressed by the compressor 22 and then introduced to the rate-dependent pressure swing adsorption unit 20. The easily adsorbable component in the rate-dependent pressure swing adsorption unit 20 flows through the secondary off-gas extracting passage 37 and is admixed with the raw gas of the passage 52 for recycling.

Figure 7:
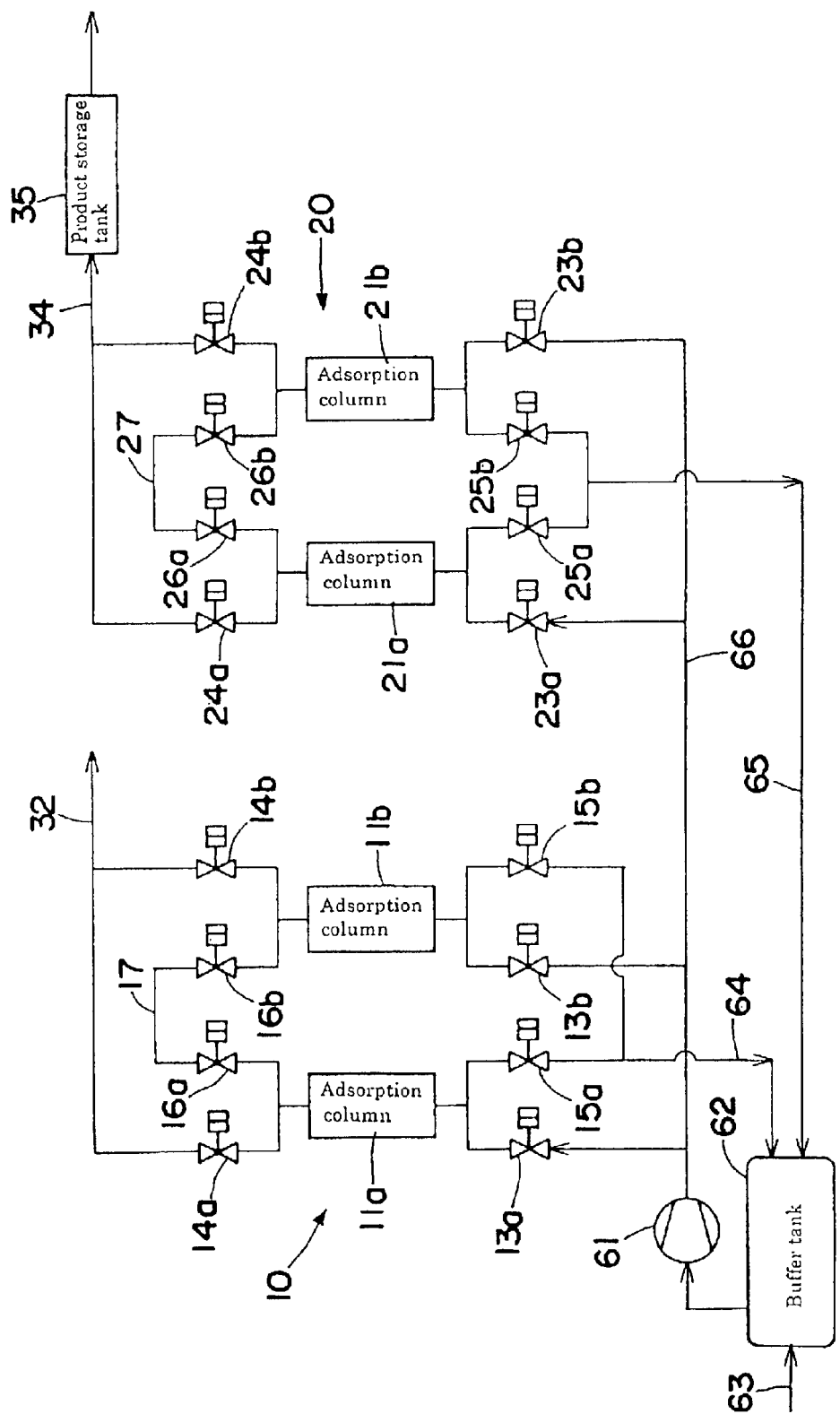
FIG. 7 is a schematic diagram showing the gas separation and purification apparatus according to a fourth embodiment of the present invention.

FIG. 7 is a schematic diagram showing the gas separation and purification apparatus according to a fourth embodiment of the present invention. The apparatus has a combination of the equilibrium pressure swing adsorption unit 10 and the rate-dependent pressure swing adsorption unit 20. In this apparatus, a gas is designed to be introduced from a single compressor 61 to both of these adsorption units 10 and 20, and a buffer tank 62 is provided on the primary side of the compressor 61. To the buffer tank 62 are connected a raw gas introducing passage 63, a passage 64 (through which the gas extracted in the regeneration step in the equilibrium pressure swing adsorption unit 10 flows) and a passage 65 (through which a gas extracted in the regeneration step in the rate-dependent pressure swing adsorption unit 20 flows) so as to mix these gases, and the mixed gas is designed to be pressure-fed from the compressor 61.

More specifically, the raw gas flowed into the buffer tank 62 from the raw gas introducing passage 63 is mixed with the gases flowed into it through the passages 64 and 65, and the resulting mixed gas is sucked into the compressor 61 and is introduced into the adsorption columns performing the adsorption step in the adsorption units 10 and 20 through a passage 66. Meanwhile, the gases extracted from the adsorption columns performing the regeneration step in the adsorption units 10 and 20 flow through the passages 64 and 65 respectively to be recycled to the buffer tank 62, and the resulting mixed gas is subjected to re-separation. This constitution can reduce the number of compressors to be installed.

Figure 8:
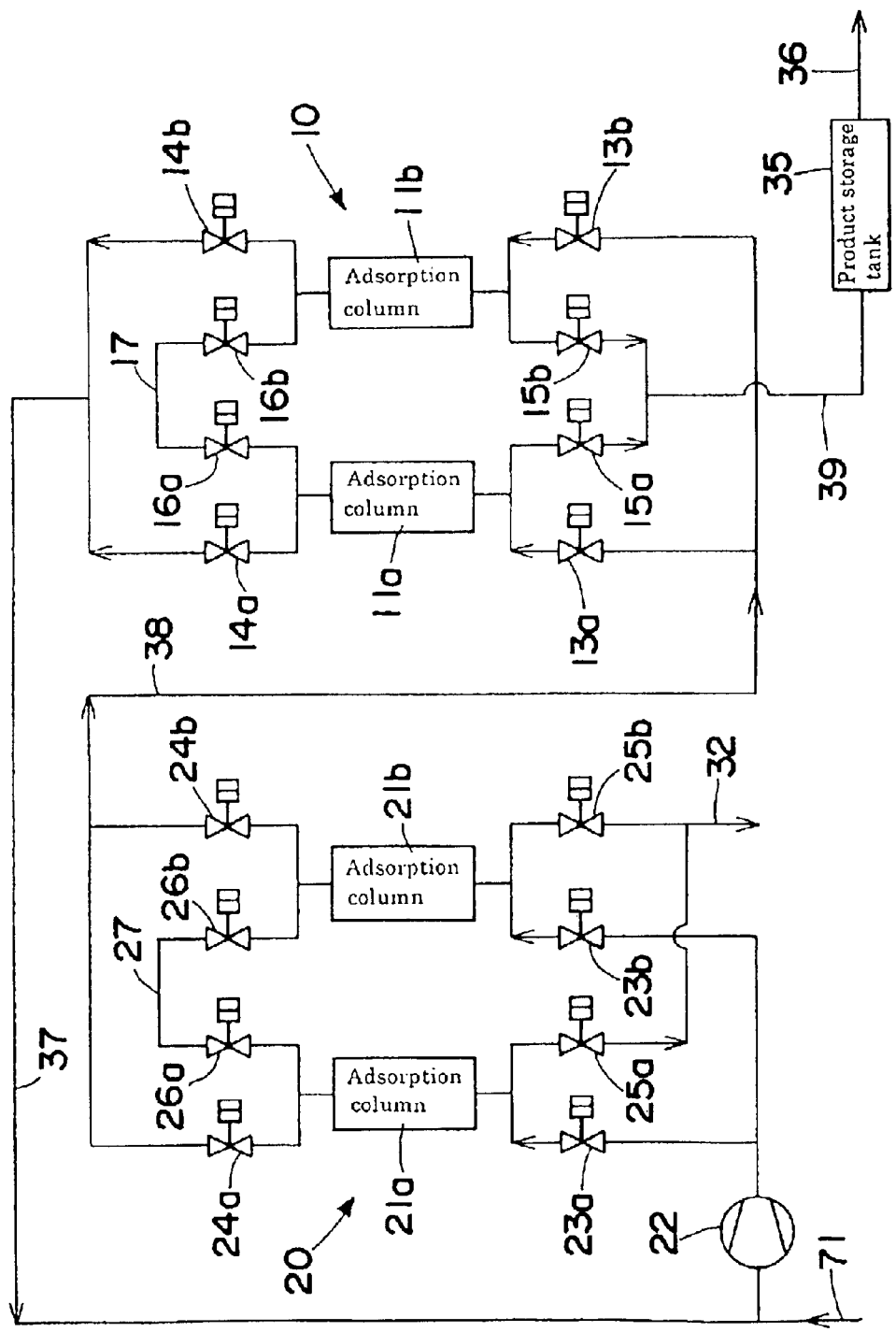
FIG. 8 is a schematic diagram showing the gas separation and purification apparatus according to a fifth embodiment of the present invention.

FIG. 8 is a schematic diagram showing the gas separation and purification apparatus according to a fifth embodiment of the present invention. This embodiment shows an example, where the apparatus has a combination of the equilibrium pressure swing adsorption unit 10 with the rate-dependent pressure swing adsorption unit 20 such that the unit 20 and the unit 10 are located on the upstream side (raw gas supply side) and on the downstream side respectively, contrary to the first embodiment, and the easily adsorbable component in the equilibrium pressure swing adsorption unit 10 is collected as a product.

In this embodiment, the raw gas containing a mixture of krypton and nitrogen is introduced through a raw gas introducing passage 71, and krypton which is a hardly adsorbable component for zeolite 4A in the rate-dependent pressure swing adsorption unit 20 is extracted in the adsorption step through the outlet valve 24a (24b) into a primary purified gas passage 38 and then introduced into the equilibrium pressure swing adsorption unit 10. Here, since the primary purified gas is extracted at a predetermined adsorption pressure in the adsorption step, the gas can be introduced as such into the equilibrium pressure swing adsorption unit 10 without compression by a compressor.

In the equilibrium pressure swing adsorption unit 10, krypton which is an easily adsorbable component for activated carbon is extracted from the adsorption column in the regeneration step into a secondary purified gas extracting passage 39 through the regeneration valve 15a (15b) and is supplied through the product storage tank 35 and the product extracting passage 36 to a site where the product gas is used.

Meanwhile, the gas extracted from the adsorption column performing the adsorption step in the equilibrium pressure swing adsorption unit 10 is led through the outlet valve 14a (14b) into the secondary off-gas extracting passage 37 and is recycled to the primary side of the compressor 22 to be admixed to the raw gas, and the resulting mixed gas is subjected to re-separation in the rate-dependent pressure swing adsorption unit 20. Meanwhile, the gas (nitrogen) extracted from the adsorption column performing the regeneration step in the rate-dependent pressure swing adsorption unit 20 through the regeneration valve 25a (25b) is released through the primary off-gas releasing passage 32.

Here, the secondary off-gas to be recycled through the secondary off-gas extracting passage 37 to the rate-dependent pressure swing adsorption unit 20 may be introduced thereto after compression by a compressor (not shown) provided on the secondary off-gas extracting passage 37. Further, the product extracting passage 36 may, as necessary, be provided with a compressor for pressure-feeding krypton.

In the second to fifth embodiments, the pressure swing adsorption units 10 and 20 each perform separation of krypton and nitrogen from each other continuously by switching the adsorption columns 11a and 11b (21a and 21b) between the adsorption step and the regeneration step interchangeably to achieve separation and purification of krypton contained in the raw gas like in the first embodiment.

It should be noted here that, while a mixed gas of krypton and nitrogen was given as an example of the simplest raw gas composition in each of the foregoing embodiments, the mixed gas may contain xenon and nitrogen, and xenon can be separated and collected likewise. The mixed gas of xenon and nitrogen may additionally contain krypton. Further, valuable gases which can be separated and purified according to the present invention include those containing high-purity isotopes such as $^1H_2$, $D_2$, $^3He$, $^{13}CO$, $C^{18}O_2$, $C^{17}O_2$, $^{18}O_2$, $^{17}O_2$, $H_2^{18}O_2$, $H_2^{17}O_2$, $D_2O$, $^{15}N_2$, $^{15}N_2O$, $^{15}NO$ and $^{15}NO_2$.

Meanwhile, the gas to be released as the primary off-gas or gases other than the valuable gas, such as oxygen, moisture, carbon monoxide, carbon dioxide, hydrogen and hydrocarbons can also be separated likewise from the valuable gas like in the case of nitrogen as described above. Further, the position where the raw gas is introduced may suitably be selected depending on the composition, flow rate, etc. of the mixed gas to be supplied as a raw gas. In addition, the constitution of each pressure swing adsorption unit may suitably be selected, and there may be employed a multi-column system having three or more adsorption columns.

Figure 9:
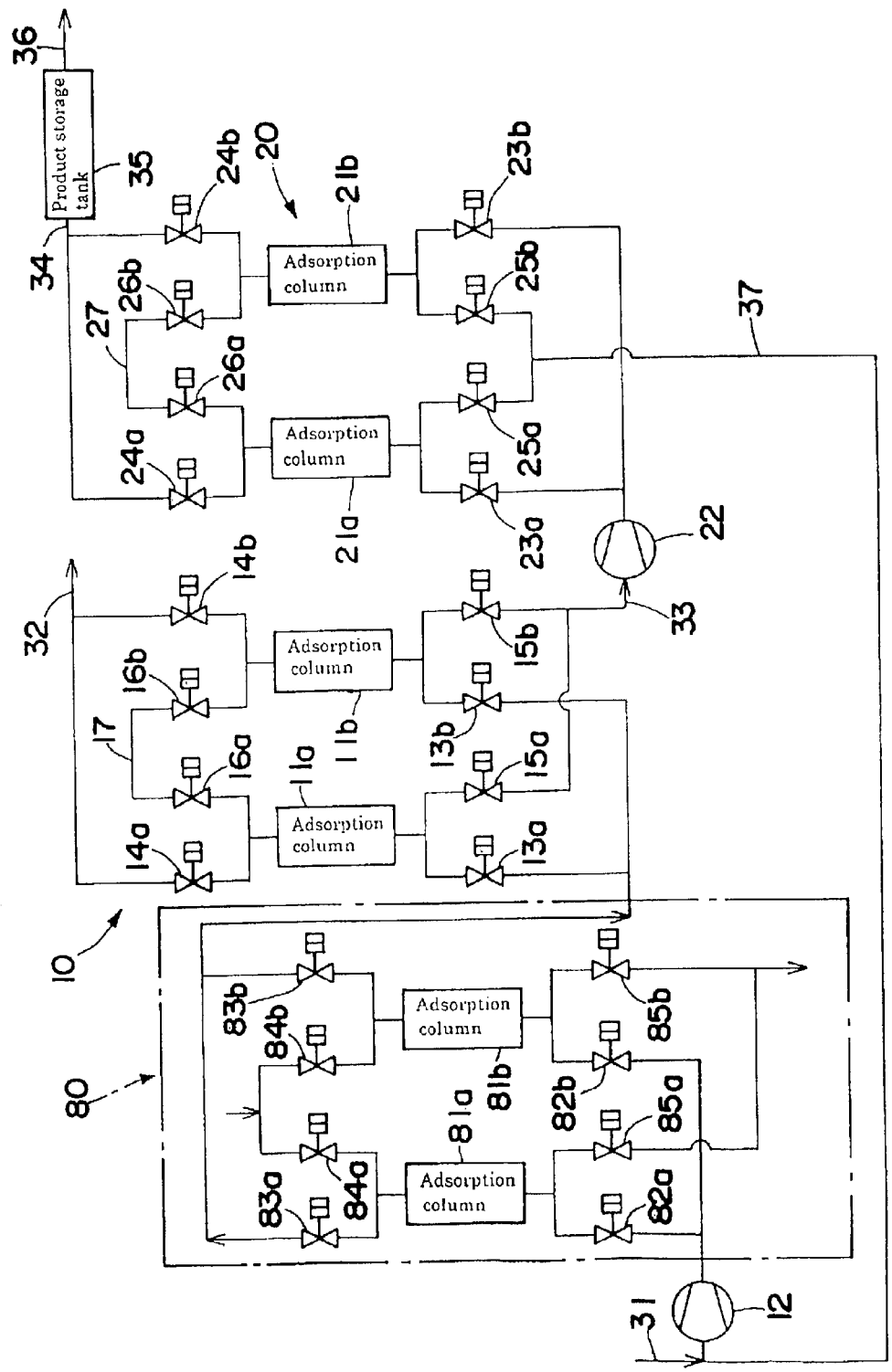
FIG. 9 is a schematic diagram showing the gas separation and purification apparatus according to a sixth embodiment of the present invention.

FIG. 9 is a schematic diagram of the gas separation and purification apparatus according to a sixth embodiment of the present invention, showing an example where a pretreatment separation unit 80 is installed on the upstream side of the gas separation and purification apparatus having a combination of the equilibrium pressure swing adsorption unit 10 and the rate-dependent pressure swing adsorption unit 20.

This embodiment is suitable for treating a mixed gas (raw gas) containing relatively large amounts of moisture and carbon dioxide, for example, in the case where xenon used as an anesthetic gas is separated from a patient's exhalation in the form of purified product.

The pretreatment separation unit 80 has a pair of adsorption columns 81a and 81b, a pair of inlet valves 82a and 82b, a pair of outlet valves 83a and 83b, a pair of regeneration gas inlet valves 84a and 84b, and a pair of regeneration gas outlet valves 85a and 85b. An adsorbent such as zeolite, carbon molecular sieve and the like for removing moisture and carbon dioxide is packed in the adsorption columns 81a and 81b, and the moisture and carbon dioxide contained in the raw gas are designed to be separated by means of temperature swing adsorption process.

More specifically, the raw gas from the raw gas introducing passage 31 is compressed by the compressor 12 and then introduced into the pretreatment separation unit 80 where the moisture and carbon dioxide are removed, and the resulting raw gas is introduced successively to the equilibrium pressure swing adsorption unit 10 and the rate-dependent pressure swing adsorption unit 20 of the gas separation and purification apparatus and is extracted to the secondary purified gas extracting passage 34. The gas extracted to the secondary purified gas extracting passage 34 is stored temporarily as a product xenon in the product storage tank 35 and then supplied through the product extracting passage 36 to a site where the product gas is used.

By removing beforehand moisture, carbon dioxide and other impurity components in the pretreatment separation unit 80 as described above, the moisture and the like which are likely to be adsorbed by various kinds of adsorbents can be prevented from accumulating in the system of the gas separation and purification apparatus. Incidentally, the gas separation and purification apparatus to which the pretreatment separation unit 80 is installed may have a desired constitution, and, for example, any of those in the first to fifth embodiments can be employed.

EXAMPLE 1

The gas separation and purification apparatus shown in FIG. 1 was used to carry out a test for separating and purifying a noble gas. In the equilibrium pressure swing adsorption unit 10, each adsorption column having an inside diameter of 70 mm and a length of 1,000 mm was packed with 1.7 kg of activated carbon as an adsorbent, and the unit 10 was operated under the following conditions:

Half cycle time of equilibrium separation operation: 420 sec.;

| | |
|---|---|
| Pressure in the adsorption step: | 604 kPa; and |
| Pressure in the regeneration step: | 102 kPa. |

Meanwhile, in the rate-dependent pressure swing adsorption unit 20, each adsorption column having an inside diameter of 70 mm and a length of 1,000 mm was packed with 2.6 kg of zeolite 4A as an adsorbent, and the unit 20 was operated under the following conditions:

Half cycle time of equilibrium separation operation: 300 sec.;

| | |
|---|---|
| Pressure in the adsorption step: | 828 kPa; and |
| Pressure in the regeneration step: | 102 kPa. |

A mixed gas of krypton (51.5%) and nitrogen (48.5%) was introduced as a raw gas to this gas separation and purification apparatus at a flow rate of 2 L/min. (the flow rate [L/min.] is a conversion to a value as measured at 0° C. and at 1 atm.; the same shall apply hereinafter) Thus, a nitrogen gas having a concentration of 97% was released through the primary off-gas releasing passage 32 of the equilibrium pressure swing adsorption unit 10 at a flow rate of 1 L/min., whereas a krypton gas having a concentration of 99.9% was collected through the secondary purified gas extracting passage 34 at a flow rate of 1 L/min. Here, the secondary off-gas flowing through the secondary off-gas extracting passage 37 had a krypton concentration of 43% and a flow rate of about 4 L/min.

EXAMPLE 2

The gas separation and purification apparatus shown in FIG. 5 was used to carry out a test for separating and purifying a noble gas. In the equilibrium pressure swing adsorption unit 10, each adsorption column was packed with 2.0 kg of activated carbon as an adsorbent. Meanwhile, in the rate-dependent pressure swing adsorption unit 20, each adsorption column was packed with 5.0 kg of zeolite 4A as an adsorbent.

A mixed gas of krypton (30%) and nitrogen (70%) was introduced as a raw gas to this gas separation and purification apparatus at a flow rate of 2 L/min. Thus, a nitrogen gas having a concentration of 99.9% was released through the primary off-gas releasing passage 32 of the equilibrium pressure swing adsorption unit 10 at a flow rate of 1.4 L/min., whereas a krypton gas having a concentration of 99.99% was collected through the secondary purified gas extracting passage 34 at a flow rate of 0.6 L/min. Here, the secondary off-gas flowing through the secondary off-gas extracting passage 37 had a krypton concentration of 37% and a flow rate of about 9.4 L/min.

EXAMPLE 3

The gas separation and purification apparatus shown in FIG. 6 was used to carry out a test for separating and purifying a noble gas. In the equilibrium pressure swing adsorption unit 10, each adsorption column was packed with 4.0 kg of activated carbon as an adsorbent. Meanwhile, in the rate-dependent pressure swing adsorption unit 20, each adsorption column was packed with 4.0 kg of zeolite 4A as an adsorbent.

A mixed gas of krypton (70%) and nitrogen (30%) was introduced as a raw gas to this gas separation and purification apparatus at a flow rate of 2 L/min. Thus, a nitrogen gas having a concentration of 99.9% was released through the primary off-gas releasing passage 32 of the equilibrium pressure swing adsorption unit 10 at a flow rate of 0.6 L/min., whereas a krypton gas having a concentration of 99.99% was collected through the secondary purified gas extracting passage 34 at a flow rate of 1.4 L/min. Here, the secondary off-gas flowing through the secondary off-gas extracting passage 37 had a krypton concentration of 80% and a flow rate of about 6 L/min.

EXAMPLE 4

The gas separation and purification apparatus shown in FIG. 7 was used to carry out a test for separating and purifying a noble gas. In the equilibrium pressure swing adsorption unit 10, each adsorption column was packed with 3.0 kg of activated carbon as an adsorbent. Meanwhile, in the rate-dependent pressure swing adsorption unit 20, each adsorption column was packed with 4.0 kg of zeolite 4A as an adsorbent.

A mixed gas of krypton (50%) and nitrogen (50%) was introduced as a raw gas to this gas separation and purification apparatus at a flow rate of 2 L/min. Thus, a nitrogen gas having a concentration of 99.9% was released through the primary off-gas releasing passage 32 of the equilibrium pressure swing adsorption unit 10 at a flow rate of 1.0 L/min., whereas a krypton gas having a concentration of 99.99% was collected through the secondary purified gas extracting passage 34 at a flow rate of 1.0 L/min.

EXAMPLE 5

The gas separation and purification apparatus shown in FIG. 8 was used to carry out a test for separating and purifying a noble gas. In the equilibrium pressure swing adsorption unit 10, each adsorption column was packed with 3.0 kg of activated carbon as an adsorbent. Meanwhile, in the rate-dependent pressure swing adsorption unit 20, each adsorption column was packed with 4.0 kg of zeolite 4A as an adsorbent.

A mixed gas of krypton (50%) and nitrogen (50%) was introduced as a raw gas to this gas separation and purification apparatus at a flow rate of 2 L/min. Thus, a nitrogen gas having a concentration of 99.9% was released through the primary off-gas releasing passage 32 of the equilibrium pressure swing adsorption unit 10 at a flow rate of 1.0 L/min., whereas a krypton gas having a concentration of 99.99% was collected through the secondary purified gas extracting passage 34 at a flow rate of 1.0 L/min.

What is claimed is:

1. In a gas separation and purification process for separating a xenon and/or krypton gas in the form of purified product from a mixed gas of which main components are xenon and/or krypton and nitrogen, as a raw gas, by means of pressure swing adsorption process, wherein the improvement comprises:
   separating the raw gas by equilibrium pressure swing adsorption process using activated carbon as an adsorbent into a desorption gas and an off-gas containing nitrogen; and
   separating the desorption gas separated by said equilibrium pressure swing adsorption process by rate-dependent pressure swing adsorption process using Na-A zeolite as an adsorbent into a second desorption gas and xenon and/or krypton as a product gas.

2. The gas separation and purification process according to claim 1, wherein the second desorption gas separated by the rate-dependent pressure swing adsorption process is circulated to the equilibrium pressure swing adsorption process to be subjected to re-separation there.

3. In a gas separation and purification process for separating xenon and/or krypton gas in the form of purified product from a mixed gas of which main components are xenon and/or krypton and nitrogen, as a raw gas, by means of pressure swing adsorption process, wherein the improvement comprises:
   separating the raw gas by rate-dependent pressure swing adsorption process using Na-A zeolite as an adsorbent into a desorption gas and the xenon and/or krypton as a product gas;
   separating the desorption gas separated by said rate-dependent pressure swing adsorption process by equilibrium pressure swing adsorption process using activated carbon as an adsorbent to release the nitrogen gas as an off-gas; and
   circulating the desorption gas separated by the equilibrium pressure swing adsorption process to the rate-dependent pressure swing adsorption process to be subjected to re-separation there.

4. In a gas separation and purification process for separating gas in the form of purified product from a mixed gas of which main components are xenon and/or krypton and nitrogen, as a raw gas, by means of pressure swing adsorption process, wherein the improvement comprises:
   separating a part of the raw gas by equilibrium pressure swing adsorption process using activated carbon as an adsorbent to release nitrogen gas as an off-gas and to admix desorption gas separated by said equilibrium pressure swing adsorption process with the raw gas before compression;
   separating the rest of the raw gas into a second desorption gas and xenon and/or krypton gas by rate-dependent pressure swing adsorption process using Na-A zeolite as an adsorbent to collect the xenon and/or krypton gas as a product gas; and admixing the second desorption gas separated by the rate-dependent pressure swing adsorption process with the raw gas before compression.

5. In a gas separation and purification process for separating xenon and/or krypton gas in the form of purified product from a mixed gas of which main components are xenon and/or krypton and nitrogen, as a raw gas, by means of pressure swing adsorption process, wherein the improvement comprises:
using as the pressure swing adsorption process two kinds of adsorption processes (one is equilibrium pressure swing adsorption process and the other is rate-dependent pressure swing adsorption process);
recovering desorption gas separated by the equilibrium pressure swing adsorption process to a raw material supply side;
recovering desorption gas separated by the rate-dependent pressure swing adsorption process to the raw material supply side; and
admixing these recovered gases with the raw gas to supply the resulting mixed gas to an apparatus using these two pressure swing adsorption processes.

6. The gas separation and purification process according to any one of claims 1, 2, 3, 4 and 5, wherein moisture, carbon dioxide and other impurity components contained in the raw gas are removed beforehand before the raw gas is subjected to the separation and purification process.

7. A gas separation and purification apparatus for separating xenon and/or krypton gas in the form of purified product from a mixed gas of which main components are xenon and/or krypton and nitrogen, as a raw gas, by a pressure swing adsorption unit, wherein the pressure swing adsorption unit comprises a combination of an equilibrium pressure swing adsorption unit using activated carbon as an adsorbent and a rate-dependent pressure swing adsorption unit using Na-A zeolite as an adsorbent arranged in series such that the former unit is located on the upstream side and the latter unit is located on the downstream side; the equilibrium pressure swing adsorption unit being provided with a passage for extracting nitrogen gas separated by the equilibrium pressure swing adsorption unit as an off-gas and a passage for introducing desorption gas separated by the equilibrium pressure swing adsorption unit to the rate-dependent pressure swing adsorption unit; whereas the rate-dependent pressure swing adsorption unit being provided with a passage for extracting xenon and/or krypton separated by the rate-dependent pressure swing adsorption unit as a product gas.

8. The gas separation and purification apparatus according to claim 7, further comprising a passage for circulating desorption gas separated by the rate-dependent pressure swing adsorption unit to the raw gas supply side of the equilibrium pressure swing adsorption unit.

9. In a gas separation and purification process for separating xenon and/or krypton gas in the form of purified product from a mixed gas of which main components are xenon and/or krypton and nitrogen, as a raw gas, by a pressure swing adsorption unit, the apparatus comprising:

an equilibrium pressure swing adsorption unit using activated carbon as an adsorbent and a rate-dependent pressure swing adsorption unit using Na-A zeolite as an adsorbent;

a passage for diverting the raw gas and supplying it into the equilibrium pressure swing adsorption unit and to the rate-dependent pressure swing adsorption unit;

a passage for admixing desorption gas separated by the equilibrium pressure swing adsorption unit with the raw gas to be supplied to the rate-dependent pressure swing adsorption unit; and a passage for admixing desorption gas separated by the rate-dependent pressure swing adsorption unit with the raw gas to be supplied to the equilibrium pressure swing adsorption unit.

10. In a gas separation and purification process for separating xenon and/or krypton gas in the form of purified product from a mixed gas of which main components are xenon and/or krypton and nitrogen, used as a raw gas, by a pressure swing adsorption unit, the apparatus comprising:

an equilibrium pressure swing adsorption unit using activated carbon as an adsorbent and a rate-dependent pressure swing adsorption unit using Na-A zeolite as an adsorbent;

a compressor for supplying a raw gas to both of the equilibrium pressure swing adsorption unit and the rate-dependent pressure swing adsorption unit; and a buffer tank provided on the primary side of the compressor; and a raw gas introducing passage, a passage through which a gas extracted in a regeneration step of the equilibrium pressure swing adsorption unit flows and a passage through which a gas extracted in a regeneration step of the rate-dependent pressure swing adsorption unit flows, all of which being connected to the buffer tank so as to mix these gases;

wherein the resulting mixed gas is designed to be supplied from the compressor to both pressure swing adsorption units.

* * * * *